Jan. 21, 1964  G. IRWIN  3,118,613
FLASH BULB HOLDER AND CAMERA ASSEMBLY
Filed Feb. 15, 1962

INVENTOR.
George Irwin
BY
Ooms, McDougall and Hersh
Attys

United States Patent Office 3,118,613
Patented Jan. 21, 1964

3,118,613
FLASH BULB HOLDER AND CAMERA ASSEMBLY
George Irwin, Highland Park, Ill., assignor to Imperial Camera Corp., Chicago, Ill., a corporation of Delaware
Filed Feb. 15, 1962, Ser. No. 173,533
2 Claims. (Cl. 240—1.3)

This invention relates to an improved means for holding flash bulbs in a novel camera assembly, and the invention relates more particularly to a device which enables holding and ejecting of a flash bulb employed in a flash gun whereby it will be accurately positioned for firing and easily and quickly ejected after firing.

There are many types of flash guns and holders available on the market, many of which are expensive, complicated and unduly cumbersome. Present day equipment is usually characterized by means for firing relatively large flash bulbs, and ordinarily the firing means are separate from the camera.

With the advent of the more diminutive flash bulb, particularly the type known as the AG-1, it has become possible to employ smaller over-all units, less expensive assemblies and, in many cases, it has proven desirable to provide a camera and flash unit as an integrated assembly.

Some problems have arisen, however, with regard to the finding of an economical and relatively compact means for accurately positioning and holding the small bulbs. Thus, the bulbs are desirably held in a specific firing position in order to achieve the best and most consistent results. Similar problems have arisen relating to means for ejecting the spent bulbs, since many of the present mechanisms are unreliable and require an undue amount of space. These problems are particularly critical in a case where it is desired to provide an integrated camera and flash unit assembly. It will be apparent that bulky, complicated and unduly expensive mechanisms are undesirable in such integrated assemblies.

It therefore becomes an object of this invention to provide an improved means for holding and ejecting flash bulbs which will also provide for accurate positioning of the bulbs.

It is a further object of this invention to provide means which will eliminate many of the expensive, complicated and cumbersome features of existing flash units.

It is an additional object of this invention to provide an improved flash bulb holding and ejecting system which is particularly designed for use in connection with present day diminutive flash bulbs, and which is peculiarly adapted for use in connection with assemblies wherein a camera and flash unit are integrated.

It is a still further object of this invention to provide an improved means for holding and ejecting flash bulbs which is characterized by mechanisms which are economical, relatively compact, and adapted for consistent results.

These and other objects of this invention will hereinafter appear and, for purposes of illustration, but not of limitation, specific embodiments of this invention are shown in the accompanying drawings in which.

Figure 7:
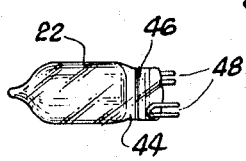
FIGURE 7 is a detail illustration of the diminutive type flash bulb particularly suitable for use in the mechanisms of this invention.

The present invention generally includes a flash bulb holder for a camera which is adapted to hold in firing position a flash bulb of the type shown in FIGURE 7. This bulb is characterized by a stem with depressions formed therein. The holding mechanism comprises a pair of resilient arms fixed to the camera housing, spaced apart to define a bulb receiving space. Protrusions are formed in the opposing faces of the resilient arms, and the protrusions are spaced apart a distance less than the thickness of the stem, whereby forcing of the stem into the bulb receiving space will spread the arms until the protrusions seat within the depressions formed in the bulb.

The bulb ejecting means, which cooperate with the bulb retaining means, comprises a means adapted to move into the bulb receiving space, force the resilient arms apart and eject the bulb after firing thereof. The ejecting means preferably comprises a lever mounted on the end of the resilient arms. The lever is provided with a first arm, adapted to abut a bulb retained by the resilient arms, and is also provided with a second arm which extends outside the housing of the assembly for actuation purposes.

The flash bulb holder described is suitable for providing a novel flash unit and a novel flash unit and camera assembly of the integrated type. The characteristics of the present invention will be more readily understood when considering the accompanying drawings.

The drawings illustrate an assembly 10 which comprises a flash unit 12 and a flash unit and camera housing 14. A conventional view finder 16 is provided in the housing.

The flash unit 12 is made up of a cone-shaped reflector 18 and a centrally located orifice 20 which is adapted to receive a flash bulb 22. The mechanism for holding and positioning of the flash bulb with respect to the flash unit comprises a pair of L-shaped resilient arms 24 with the base portion thereof fastened at 26 to the housing 14. The projecting arms of the resilient arms 24 are provided with inwardly facing knobs 30 in their opposing faces.

An ejecting lever 32 is pivotally mounted at 34 on the ends of the arms 24 by means of trunnions 36. The lever 32 comprises an actuating arm 38 which extends through a slot 39 formed in the housing 14. The lever 32 further includes an ejecting arm 40 which is provided with an abutting edge 42.

The bulb 22, shown in FIGURE 7, is comprised of a neck portion 44 having depressions 46 formed therein. Contacts 48 are located on either side of the neck portion and are adapted to ride against the projecting arms 28 of the L-shaped member 24. The member 24 is connected in a conventional flash bulb firing circuit, not shown.

Figure 6:
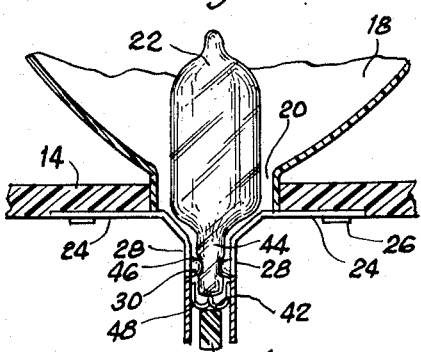
FIGURE 6 is a sectional view of the holding and ejecting mechanism taken about the line 6—6 of FIGURE 5.

In order to understand the operation of the disclosed apparatus, it is necessary to point out that the closest points of the knobs 30 on the arms 28 of the resilient members 24 are normally spaced apart a distance less than the thickness of the neck of the bulb 22. Therefore, in employing the disclosed mechanisms for the firing of a flash bulb, a bulb 22 is first inserted into the orifice 20 formed in the reflector 28. The leading edge of the bulb 22 will spread apart the arms 28 when the leading edge abuts the knobs 30. As the operator continues to force the bulb 22 into the unit, the knobs 30 will eventually come to rest within the depressions 46 as shown in FIGURE 6. The bulb is now positioned for firing since the contacts 48 are in engagement with the arms 28 which are connected to the bulb firing circuit. It will be apparent that a consistent positioning of the bulb is possible since the depression 46 will always be in alignment with the knobs 30.

Figure 1:
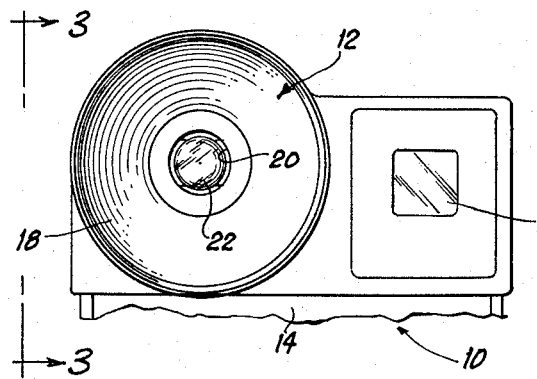
FIGURE 1 is a front view of a section of an integrated assembly comprising a camera and flash unit.
Figure 3:
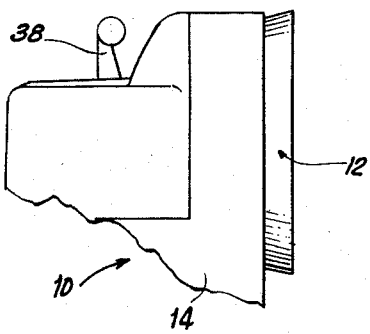
FIGURE 3 is a side view of the camera and flash unit assembly taken about the line 3—3 of FIGURE 1.
Figure 2:
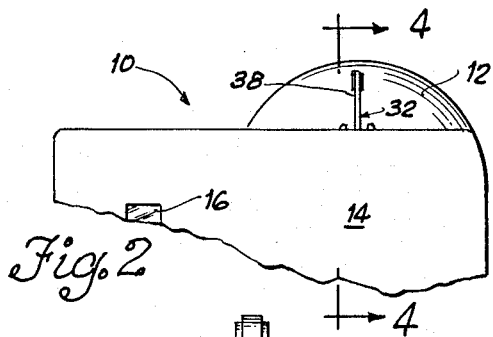
FIGURE 2 is a rear view of the camera and flash unit assembly shown in FIGURE 1.
Figure 4:
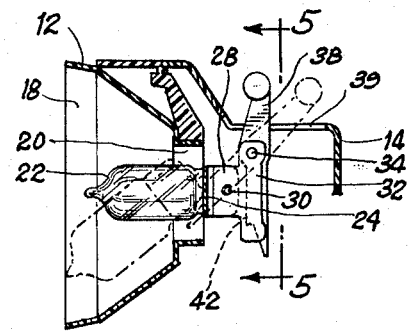
FIGURE 4 is a cross-sectional view taken about the line 4—4 of FIGURE 2, illustrating the flash bulb holding and ejecting mechanisms of this invention.
Figure 5:
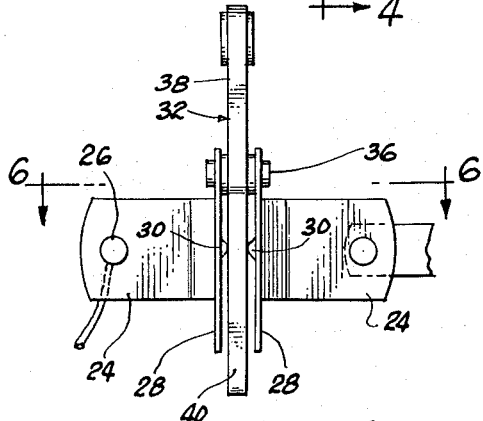
FIGURE 5 is a rear sectional view of the holding and ejecting mechanism taken about the line 5—5 of FIGURE 4.

After firing of the bulb, the spent bulb is quickly and easily ejected by means of the lever 32. As shown in FIGURE 4, the actuating arm 38 is accessible from outside the housing 14. The arm is pulled by the operator to the dotted line position, and as it pivots at 34 the abutting edge 42 will force the bulb 22 forwardly. This will cause the arms 28 to spread and the bulb will be forced out of the orifice 20.

The advantages of the present assembly reside in the ability of the assembly to accurately position and securely hold bulbs of the AG-1 type. The bulbs, which are approximately 1¼ inches long and less than ½ inch in diameter, may be thus readied for firing in a reliable manner despite their size. The disclosed unit further provides for rapid and efficient ejection of the spent bulbs and quick insertion of a new bulb by merely pressing the neck of the bulb into the reflector orifice. A distinct advantage of the present device lies in the relatively simple compact mechanism which makes the unit highly economical. Thus, the mounting of the ejecting means on the resilient member is a great space saving feature and also permits the use of a virtually defect proof mechanical expedient. Furthermore, the unitary nature of the ejecting mechanism along with the easy accessibility from the outside of the housing provide distinct advantages over prior art devices.

The compact, economical structure is peculiarly adaptable for incorporation into a unit wherein the camera and the flash unit are integrated in a single housing. Similarly the unit is particularly adaptable for the type of diminutive flash bulb described. However, it is contemplated that independent flash units may be adapted for provision of the characteristics of this invention, and that other types and sizes of flash bulbs may be employed.

It will be understood that various modifications may be made in the above described structure which provide the characteristics of this invention without departing from the spirit thereof, particularly as defined in the following claims.

I claim:

1. In the combination of a camera and an integrated flash unit wherein an orifice is provided centrally of a reflector for insertion of a flash bulb of the type having elongated recesses formed transversely of the stem and a pair of contacts provided on either side of said stem, the improvement comprising means for holding said bulbs in firing position, said holding means comprising a pair of resilient arms connected in a bulb firing circuit and fixed to the camera housing adjacent said orifice, said arms having their opposing faces defining a bulb receiving space, a pair of knobs formed in said opposing faces and being spaced apart a distance less than the thickness of said stem, said knobs being adapted to seat within said recesses; a lever pivotally mounted on said resilient arms within said housing, said lever including a bulb ejecting arm and an actuating arm extending through an opening defined in said housing and accessible from the exterior of said housing, said bulb ejecting arm being adapted to move into said bulb receiving space; whereby forcing of said stem through said orifice into said bulb receiving space and into engagement with said knobs will cause said resilient arms to spread, to engage said bulb contacts, and will permit said knobs to seat within said recesses and whereby actuation of said lever will cause said bulb ejecting arm to pass into said bulb receiving space to eject said bulb after firing thereof.

2. An improved flash unit for use in firing flash bulbs of the type having elongated recesses formed transversely of the stem and a pair of contacts provided on either side of said stem, said flash unit including a housing, a reflector associated with said housing, and having an orifice provided centrally thereof for positioning said bulbs, a pair of resilient L-shaped conductive strips having the base portions thereof fastened to a wall interiorly of said housing adjacent said orifice, and having the arms thereof extending from said wall to define a bulb receiving space, said strips being electrically insulated from each other and being connected in a bulb firing circuit, a pair of opposed knobs formed on the opposing faces of said arms and spaced apart a distance less than the thickness of said stem, said knobs being adapted to seat within said recesses; a lever pivotally mounted within said housing, said lever including a bulb ejecting arm having a thickness less than the distance between the opposing faces of said strips and an actuating arm, said bulb ejecting arm being adapted to move into said bulb receiving space free from contact with said opposing faces; whereby forcing of said stem through said orifice into said bulb receiving space and into engagement with said knobs will cause said resilient arms to spread and to engage said bulb contacts, and will permit said knobs to seat within said recesses and whereby actuation of said lever will cause said bulb ejecting arm to pass into said bulb receiving space to eject said bulb after firing thereof.

References Cited in the file of this patent

UNITED STATES PATENTS

| | | |
|---|---|---|
| 2,228,646 | Summers | Jan. 14, 1941 |
| 2,738,476 | Buquor | Mar. 13, 1956 |
| 2,910,554 | Lessler | Oct. 27, 1959 |
| 3,001,461 | Irwin | Sept. 26, 1961 |
| 3,015,023 | Dayton et al. | Dec. 26, 1961 |

FOREIGN PATENTS

| | | |
|---|---|---|
| 785,493 | Great Britain | Oct. 30, 1957 |
| 1,110,009 | Germany | June 29, 1961 |
| 1,111,507 | Germany | July 20, 1961 |